(12) United States Patent
Hung et al.

(10) Patent No.: US 8,501,872 B2
(45) Date of Patent: Aug. 6, 2013

(54) CURABLE FLUOROELASTOMER COMPOSITIONS

(75) Inventors: Ming-Hong Hung, Wilmington, DE (US); Bruno Ameduri, Montpellier (FR); Guillaume Tillet, Beruges (FR)

(73) Assignees: E I du Pont de Nemours and Company, Wilmington, DE (US); Le Centre National de la Recherche Scientifique (FR)

( * ) Notice: Subject to any disclaimer, the term of this patent is extended or adjusted under 35 U.S.C. 154(b) by 0 days.

(21) Appl. No.: 13/611,083

(22) Filed: Sep. 12, 2012

(65) Prior Publication Data
US 2013/0012673 A1    Jan. 10, 2013

Related U.S. Application Data

(62) Division of application No. 12/486,325, filed on Jun. 17, 2009, now Pat. No. 8,288,482.

(51) Int. Cl.
*C08F 8/00*    (2006.01)
*C08F 214/00*    (2006.01)

(52) U.S. Cl.
USPC ................. 525/326.3; 526/243; 526/247

(58) Field of Classification Search
USPC ................. 525/326.3; 526/243, 247
See application file for complete search history.

(56) References Cited

U.S. PATENT DOCUMENTS

| 2,515,246 | A | 7/1950 | McBee et al. |
|---|---|---|---|
| 4,020,176 | A | 4/1977 | Greenwald |
| 4,361,678 | A | 11/1982 | Tatemoto et al. |
| 6,114,452 | A | 9/2000 | Schmiegel |
| 2002/0049343 | A1 | 4/2002 | Hung |
| 2003/0162022 | A1 | 8/2003 | Jing |
| 2008/0131692 | A1 | 6/2008 | Rolland et al. |
| 2009/0105435 | A1 | 4/2009 | Hung et al. |
| 2010/0324234 | A1 | 12/2010 | Hung et al. |
| 2011/0135861 | A1* | 6/2011 | Manzara et al. ............ 428/36.9 |

OTHER PUBLICATIONS

Corresponding case PCT/US2010/030677, International Search Report, Korean Patent Office, Republic of Koriea, Authorized Kim, Eun Jung, Jan. 26, 2011.
Anestis L. Logothetis, Chemistry of Fluorocarbon Elastomers, Prog. Polym. Sci, 1989, pp. 251-296, vol. 14, Pergamon Press plc, Great Britain.
Kurt Baum, Clifford D. Bedford, and Ronald J. Hunadi, Synthesis of Fluorinated Acetylenes, J. Org. Chem., 1982, pp. 2251-2257, vol. 47, American Chemical Society.
Hartmuth C. Kolb, M. G. Finn, K. Barry Sharpless, Click Chemistry: Diverse Chemical Function from a Few Good Reactions, Angewandte Chemie Int. Ed., 2001, pp. 2004-2021, vol. 40(11), Wiley-VCH, Verlag GmbH.
Jean-Francois Lutz, Hans G. Borner, Katja Weichenhan, Combining Atom Transfer Radical Polymerization and Click Chemistry: A Versatile Method for the Preparation of End-Functional Polymers, Macromol. Rapid Commun, 2005, pp. 514-518, vol. 26(7), Wiley-VCH, Verlag GmbH & Co.
Jean-Francois Lutz, 1,3-Dipolar Cycloadditions of Azides and Alkynes: A Universal Litigation Tool in Polymer and Materials Science, Angewandte Chemie Int. Ed., 2007, pp. 1018-1025, vol. 46(7), Wiley-VCH, Verlag GmbH & Co. KGaA, Weinheim.
A. Manseri, B. Ameduri, B. Boutevin, M. Kotora, M. Hajek, G. Caporiccio, Synthesis of telechelic dienes from fluorinated a,w-diiodoalkanes. Part I. Divinyl and diallyl derivatives from model (C2F4)nl compounds, Journal of Fluorine Chemistry, 1995, pages 151-158, vol. 73(2), Elsevier Science S.A.
A. A. Malik, D. Tzeng, P. Cheng, K. Baum, Synthesis of Fluorinated Diisocyanates, J. Org. Chem., 1991, pp. 3043-3044, vol. 56(9), American Chemical Society.

* cited by examiner

*Primary Examiner* — Ling Choi
*Assistant Examiner* — Chun-Cheng Wang

(57) ABSTRACT

This invention relates to curable fluoroelastomer compositions comprising a) fluoroelastomers having either nitrile, alkyne or azide cure sites and b) fluorinated curatives containing diazide, dinitrile or dialkyne groups for reacting with cure sites on the fluoroelastomer. Fluoroelastomers having azide cure sites form crosslinks with curatives having dinitrile or dialkyne groups. Fluoroelastomers having nitrile or alkyne cure sites form crosslinks with curatives having diazide groups.

7 Claims, No Drawings

CURABLE FLUOROELASTOMER COMPOSITIONS

CROSS-REFERENCE TO RELATED APPLICATIONS

This application is a division of application Ser. No. 12/486,325 filed Jun. 17, 2009.

FIELD OF THE INVENTION

This invention relates to curable fluoroelastomer compositions comprising fluoroelastomers having either nitrile, alkyne or azide cure sites and fluorinated curatives containing diazide, dinitrile or dialkyne groups for reacting with cure sites on the fluoroelastomer.

BACKGROUND OF THE INVENTION

Elastomeric fluoropolymers (i.e. fluoroelastomers) exhibit excellent resistance to the effects of heat, weather, oil, solvents and chemicals. Such materials are commercially available and are most commonly either copolymers of vinylidene fluoride ($VF_2$) with hexafluoropropylene (HFP) or copolymers of $VF_2$, HFP, and tetrafluoroethylene (TFE).

Other common fluoroelastomers include the copolymers of TFE with one or more hydrocarbon olefins such as ethylene (E) or propylene (P), and also the copolymers of TFE with a perfluoro(alkyl vinyl ether) such as perfluoro(methyl vinyl ether) (PMVE).

Many fluoroelastomers require incorporation of a cure site monomer into their polymer chains in order to crosslink efficiently (Logothetis, A. L., Prog. Polym. Sci., Vol. 14, pp 251-296 (1989); A. Taguet et al. Advances in Polymer Science, Vol. 184, pp 127-211 (2005)). Without such a cure site monomer, the fluoroelastomer may not react at all with curing agents, it may only partially react, or reaction may be too slow for use on a commercial scale. Seals made from poorly crosslinked elastomers often fail sooner than might otherwise be expected. Unfortunately, disadvantages are associated with many of the cure site monomers and curatives in use today. For example, some curatives are toxic. Cure site monomers which contain reactive bromine or iodine atoms can release byproducts during the curing reaction that are harmful to the environment. Other cure site monomers (e.g. those which contain double bonds at both ends of the molecule) may be so reactive that they disrupt polymerization of the fluoroelastomer by altering the polymerization rate, terminating polymerization, or by causing undesirable chain branching, or even gelation to occur. Lastly, incorporation of a cure site monomer into a fluoroelastomer polymer chain may negatively impact the properties of the fluoroelastomer (both physical properties and chemical resistance).

There exists a need in the art for new fluoroelastomer cure systems, both new cure site monomers which are environmentally friendly, do not disrupt polymerization and which do not detract from the properties of the fluoroelastomer, and new curatives for forming crosslinks with cure site monomers.

SUMMARY OF THE INVENTION

An aspect of the present invention is a curable composition comprising

A) a fluoroelastomer comprising copolymerized units of i) a first monomer selected from the group consisting of vinylidene fluoride and tetrafluoroethylene and ii) a cure site monomer having a cure site selected from the group consisting of azide, sulfonyl azide and carbonyl azide groups; and B) a curative having the formula X—$(CH_2)_n$—R—$(CH_2)_m$—X, wherein X is an alkyne group or a nitrile group, n, m are independently 1 to 4, and R is selected from the group consisting of i) a $C_3$-$C_{10}$ fluoroalkylene group, ii) a $C_3$-$C_{10}$ fluoroalkoxylene group, iii) a substituted arylene group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin.

Another aspect of the present invention is a curable composition comprising

A) a fluoroelastomer comprising copolymerized units of i) a first monomer selected from the group consisting of vinylidene fluoride and tetrafluoroethylene and ii) a cure site monomer having a cure site selected from the group consisting of nitrile groups, and alkyne groups; and B) a curative having the formula $N_3(Y)_p$—$(CH_2)_n$—R—$(CH_2)_m$—$(Y)_p N_3$, wherein Y is SO, $SO_2$, $C_6H_4$, or CO, p is 0 or 1, n, m are independently 1 to 4, and R is selected from the group consisting of i) a $C_3$-$C_{10}$ fluoroalkylene group, ii) a $C_3$-$C_{10}$ fluoroalkoxylene group, iii) a substituted arylene group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin

DETAILED DESCRIPTION OF THE INVENTION

The present invention is directed to curable fluoroelastomer compositions that are based on new combinations of copolymerized cure site monomers and curing agents.

Fluoroelastomers employed in the curable compositions of the invention typically contain between 25 and 70 weight percent, based on the total weight of the fluoroelastomer, of copolymerized units of a first monomer which may be vinylidene fluoride ($VF_2$), or tetrafluoroethylene (TFE). The fluoroelastomer further comprises 0.2 to 10 (preferably 0.1 to 5) weight percent, based on the total composition of the fluoroelastomer, of copolymerized units of a cure site monomer (hereinafter defined). The remaining units in the fluoroelastomers are comprised of at least one additional copolymerized monomer, different from both said first monomer and said cure site monomer, said additional copolymerized monomer selected from the group consisting of fluoromonomers, hydrocarbon olefins and mixtures thereof. Fluoromonomers include both fluorine-containing olefins (fluoroolefins) and fluorine-containing vinyl ethers (fluorovinyl ethers).

Fluorine-containing olefins which may be employed in the fluoroelastomers include, but are not limited to vinylidene fluoride ($VF_2$), hexafluoropropylene (HFP), tetrafluoroethylene (TFE), 1,2,3,3,3-pentafluoropropene (1-HPFP), 1,1,3,3,3-pentafluoropropene (2-HPFP), 3,3,3-trifluoropropene; chlorotrifluoroethylene (CTFE) and vinyl fluoride.

Fluorine-containing vinyl ethers that may be employed in the fluoroelastomers include, but are not limited to perfluoro (alkyl vinyl)ethers and partially fluorinated vinyl ethers. Perfluoro(alkyl vinyl)ethers (PAVE) suitable for use as monomers include those of the formula $$CF_2=CFO(R_fO)_n(R_{f'}O)_m R_{f''} \qquad (I)$$

where $R_f$ and $R_{f''}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl)ethers includes compositions of the formula $$CF_2=CFO(CF_2CFXO)_nR_f \quad (II)$$

where X is F or $CF_3$, n is 0-5, and $R_f$ is a perfluoroalkyl group of 1-6 carbon atoms.

A most preferred class of perfluoro(alkyl vinyl)ethers includes those ethers wherein n is 0 or 1 and $R_f$ contains 1-3 carbon atoms. Examples of such perfluorinated ethers include perfluoro(methyl vinyl)ether (PMVE), perfluoro(ethyl vinyl ether) (PEVE) and perfluoro(propyl vinyl)ether (PPVE). Other useful monomers include compounds of the formula $$CF_2=CFO[(CF_2)_mCF_2CFZO]_nR_f \quad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl)ether monomers include compounds of the formula $$CF_2=CFO[(CF_2CF\{CF_3\}O)_n(CF_2CF_2CF_2O)_m(CF_2)_p]C_xF_{2x+1} \quad (IV)$$

where m and n independently=0-10, p=0-3, and x=1-5. Preferred members of this class include compounds where n=0-1, m=0-1, and x=1.

Other examples of useful perfluoro(alkyl vinyl ethers) include $$CF_2=CFOCF_2CF(CF_3)O(CF_2O)_mC_nF_{2n+1} \quad (V)$$

where n=1-5, m=1-3, and where, preferably, n=1.

If copolymerized units of PAVE are present in the fluoroelastomers employed in the invention, the PAVE content generally ranges from 25 to 65 weight percent, based on the total weight of the fluoroelastomer. If perfluoro(methyl vinyl) ether is used, then the fluoroelastomer preferably contains between 30 and 65 wt. % copolymerized PMVE units.

Hydrocarbon olefins useful in the fluoroelastomers employed in this invention include, but are not limited to ethylene (E) and propylene (P). If copolymerized units of a hydrocarbon olefin are present in the fluoroelastomers, hydrocarbon olefin content is generally 4 to 30 weight percent.

Specific examples of fluoroelastomers that may be employed in this invention (cure site monomers omitted for clarity) include, but are not limited to copolymerized units of TFE/PMVE, $VF_2$/PMVE, $VF_2$/TFE/PMVE, TFE/PMVE/E, TFE/P and TFE/P/$VF_2$.

Cure site monomers that may be employed in the fluoroelastomers are those having nitrile, alkyne or azide groups which will serve as reactive sites to form crosslinks with a curing agent.

Useful nitrile-containing cure site monomers include those of the formulas shown below.

$$CF_2=CF\text{—}O(CF_2)_n\text{—}CN \quad (VI)$$

where n=2-12, preferably 2-6;

$$CF_2=CF\text{—}O[CF_2\text{—}CF(CF_3)\text{—}O]_n\text{—}CF_2\text{—}CF(CF_3)\text{—}CN \quad (VII)$$

where n=0-4, preferably 0-2;

$$CF_2=CF\text{—}[OCF_2CF(CF_3)]_x\text{—}O\text{—}(CF_2)_n\text{—}CN \quad (VIII)$$

where x=1-2, and n=1-4; and $$CF_2=CF\text{—}O\text{—}(CF_2)_n\text{—}O\text{—}CF(CF_3)CN \quad (IX)$$

where n=2-4. Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

Cure site monomers that contain azide groups include those containing sulfonyl azide or carbonyl azide groups. Examples of sulfonyl azide cure site monomers include, but are not limited to $CF_2=CFOCF_2CF(CF_3)OCF_2CF_2\text{—}SO_2N_3$; $CF_2=CFOCF_2CF_2\text{—}SO_2N_3$; $CF_2=CFOCF_2CF_2CF_2\text{—}SO_2N_3$; and $CF_2=CFOCF_2CF_2CF_2CF_2\text{—}SO_2N_3$ as disclosed in U.S. Pat. No. 6,365,693 B1. An example of a carbonyl azide cure site monomer is $CF_2=CFOCF_2CF(CF_3)OCF_2CF_2\text{—}CON_3$ (hereinafter EVE-$CON_3$). The latter may be synthesized by the following reactions starting from $ClCF_2\text{—}CFCl\text{—}O\text{—}CF_2CF(CF_3)\text{—}OCF_2CF_2\text{—}COOH$ (hereinafter $Cl_2$-EVE-COOH).

$Cl_2$-EVE-COOH+$PCl_5$→$Cl_2$-EVE-COCl $Cl_2$-EVE-COCl+$HN_3$/Pyridine (or $NaN_3$)→$Cl_2$-EVE-$CON_3$ $Cl_2$-EVE-$CON_3$+Zn→EVE-$CON_3$+$ZnCl_2$ Examples of cure site monomers that contain alkyne groups include, but are not limited to $CF_2=CFOCF_2CF(CF_3)OCF_2CF_2\text{—}C\equiv CH$; $CF_2=CFOCF_2CF(CF_3)OCF_2CF_2\text{—}COOCH_2C\equiv CH$; and $CF_2=CFOCF_2CF(CF_3)OCF_2CF_2\text{—}CH_2CH_2\text{—}O\text{—}CH_2C\equiv CH$. A synthesis for $CF_2=CFOCF_2CF(CF_3)OCF_2CF_2\text{—}C\equiv CH$ (hereinafter EVE-C$\equiv$CH) from $Cl_2$-EVE-COOH is below.

$Cl_2$-EVE-COOH+$PCl_5$→$Cl_2$-EVE-COCl $Cl_2$-EVE-COCl+KI/Heat→$Cl_2$-EVE-I $Cl_2$-EVE-I+$CH_2=CH_2$→$Cl_2$-EVE-$CH_2CH_2$—I $Cl_2$-EVE-$CH_2CH_2$—I+KOH→$Cl_2$-EVE-CH=$CH_2$ $Cl_2$-EVE-CH=$CH_2$+$Br_2$→$Cl_2$-EVE-CHBr—$CH_2$Br $Cl_2$-EVE-CHBr—$CH_2$Br+KOH→$Cl_2$-EVE-C$\equiv$CH $Cl_2$-EVE-C$\equiv$CH+Zn→EVE-C$\equiv$CH+$ZnCl_2$ Likewise $CF_2=CFOCF_2CF(CF_3)OCF_2CF_2\text{—}COOCH_2C\equiv CH$ (hereinafter EVE-COOCH$_2$C$\equiv$CH) may be synthesized via $Cl_2$-EVE-COCl+HOCH$_2$C$\equiv$CH→$Cl_2$-EVE-COOCH$_2$C$\equiv$CH+Zn→EVE-COOCH$_2$C$\equiv$CH $CF_2=CFOCF_2CF(CF_3)OCF_2CF_2\text{—}CH_2CH_2\text{—}O\text{—}CH_2C\equiv CH$ (hereinafter EVE-$CH_2CH_2$—O—$CH_2$C$\equiv$CH) may be synthesized via $Cl_2$-EVE-$CH_2CH_2$—I+HOCH$_2$C$\equiv$CH+Base→$Cl_2$-EVE-$CH_2CH_2$—O—$CH_2$C$\equiv$CH+Zn→EVE-$CH_2CH_2$—O—$CH_2$C$\equiv$CH Fluoroelastomers employed in the invention may be made by a solution, suspension or emulsion polymerization process. Such processes are well known in the art. Preferably, an emulsion process is employed wherein an inorganic peroxide (e.g. sodium or ammonium persulfate) is the initiator. Optionally a surfactant, particularly a fluorosurfactant may be included in order to improve the stability of the emulsion.

When the fluoroelastomer contains a cure site monomer having azide groups, the curatives that may be employed in the compositions of the invention are those of formula X—(CH$_2$)$_n$—R—(CH$_2$)$_m$—X, wherein X is an alkyne group or a nitrile group, n and m are independently 1 to 4, and R is selected from the group consisting of i) a C$_3$-C$_{10}$ fluoroalkylene group, ii) a C$_3$-C$_{10}$ fluoroalkoxylene group, iii) a substituted arylene group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin. Hydrocarbon olefins that may be employed include ethylene and propylene. These oligomers (i.e. low molecular weight copolymers) may be prepared according to the processes disclosed in U.S. 20090105435 A1. Such oligomers preferably contain 10 to 50 mole percent perfluoro(methyl vinyl ether). The oligomers have a number average molecular weight of 1000 to 25,000, preferably 1200 to 12,000, most preferably 1500 to 5000.

Specific examples of such curing agents include, but are not limited to NC—(CF$_2$)$_n$—CN (n=2-20), see U.S. Pat. No. 2,515,246 and Journal of Industrial and Engineering Chemistry (Washington, D.C.) (1947), 39, 415-17; and HC≡C—(CF$_2$)$_n$—C≡CH (n=2-20), see K. Baum, et al., J. Org. Chem., 47, 2251 (1982).

When the fluoroelastomer contains a cure site monomer having nitrile or alkyne groups, the curatives that may be employed in the compositions of the invention are those of formula N$_3$(Y)$_p$—(CH$_2$)$_n$—R—(CH$_2$)$_m$—(Y)$_p$N$_3$, wherein Y is SO, SO$_2$, C$_6$H$_4$, or CO, p is 0 or 1, n and m are independently 1 to 4, and R is selected from the group consisting of i) a C$_3$-C$_{10}$ fluoroalkylene group, ii) a C$_3$-C$_{10}$ fluoroalkoxylene group, iii) a substituted arylene group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin.

Specific examples of such curing agents include, but are not limited to N$_3$CH$_2$CH$_2$CF$_2$CF$_2$CF$_2$CF$_2$CF$_2$CH$_2$CH$_2$N$_3$; N$_3$—CH$_2$CH$_2$—(CF$_2$)$_4$—CH$_2$CH$_2$N$_3$ (U.S. Pat. No. 4,020,176); N$_3$—CO—CH$_2$—(CF$_2$)$_4$—CH$_2$—CO—N$_3$ (JP 57108055 A); and N$_3$C$_2$H$_4$-poly(VF$_2$-co-PMVE)-C$_2$H$_4$N$_3$. The latter may be prepared by the reaction of sodium azide with I—CH$_2$CH$_2$—(VF$_2$-co-PMVE)-CH$_2$CH$_2$—I made according to the process of US 20090105435 A1.

Curable compositions of the invention may also, optionally, contain additives typically employed in the elastomer industry including, but not limited to accelerators, acid acceptors, fillers, colorants, process aids, etc.

EXAMPLES

Test Methods

Nuclear Magnetic Resonance Spectroscopy:

Compositions and the structures were determined by $^{19}$F and $^1$H NMR spectroscopy. The NMR spectra were recorded on BRUKER® AC 250 or 400 (250 and 400 MHz) instruments, using deuterated acetone as the solvent and tetramethylsilane (TMS) or CFCl$_3$ as the references for $^1$H (or $^{19}$F) nuclei. Coupling constants and chemical shifts are given in Hz and ppm, respectively. The experimental conditions for $^1$H (or $^{19}$F) NMR spectra were the following: flip angle 90° (or 30°), acquisition time 4.5 s (or 0.7 s), pulse delay 2 s (or 5 s), number of scans 128 (or 512), and a pulse width of 5 µs for $^{19}$F NMR.

Chromatography:

Size Exclusion Chromatography (SEC) analysis was performed with a Spectra-Physics apparatus equipped with two PLgel 5 µm Mixed-C columns from Polymer Laboratories and a Spectra Physics SP8430 RI detector. Tetrahydrofuran (THF) was the eluent, temperature was 30° C., and the flow rate was 0.8 mL min$^{-1}$. Poly(styrene) or poly(methylmethacrylate) standards (Polymer Laboratories) were used to give relative values of the molecular weights. Samples of a known concentration (ca. 2 wt. %) were filtered through a 200 micron PTFE chromafil membrane prior to injection.

Thermal Properties:

The glass transition temperatures (T$_g$) were determined by differential scanning calorimetry (DSC) using a Perkin Elmer Pyris 1 apparatus calibrated with indium and n-decane. The samples (about 10 mg) were initially cooled to −105° C. for 10 mins, then heated from −100° to 50° C. at a heating rate of 20° C./min (a second recooling was done to −105° C., and the same cycle repeated three times). The values of T$_g$ reported herein correspond to the inflection point of the differential heat flow.

TGA analyses were performed using a Texas Instrument ATG 51-133 apparatus under air at the heating rate of 20° C./min from room temperature (approximately 20° C.) up to 550° C.

Example 1

In this example, a curable composition of the invention is made comprising a) a fluoroelastomer terpolymer of vinylidene fluoride (VF$_2$), perfluoro(methyl vinyl ether) (PMVE) and CF$_2$=CFOCF$_2$CF(CF$_3$)OCF$_2$CF$_2$CN (8-CNVE) and b) a diazido curative. The resulting composition is then cured.

(A) Synthesis of the Fluoroelastomer:

A 300-mL Hastelloy autoclave, equipped with inlet and outlet valves, a manometer and a rupture disc, was degassed and pressurized with 30 bar of nitrogen to check for leaks. Then, a 0.5 mm Hg vacuum was operated for 5 minutes (min.) and subsequently an Ar atmosphere was applied. This autoclave degassing procedure was repeated five times. Under vacuum, 8.1 g (17.8 mmol) of 1,4-diiodoperfluorobutane, 0.3 g (1.26 mmol) of Na$_2$S$_2$O$_8$ dissolved in 90 ml of water, 7.8 g (20 mmol) of 8-CNVE and 1.35 g of ammonium perfluorooctanoate (3.13 mmol) dissolved in 5 ml of 1,1,1,3,3-pentafluorobutane were transferred into the autoclave. Then, by double weighing, 16 g (0.25 moles) of VF$_2$ and 24 g (0.145 mol) of PMVE were introduced into the autoclave. Then, the autoclave was progressively heated to 80° C. During the reaction, the pressure dropped from 22 to 14 bars in 24 hours. After reaction, the autoclave was placed in an ice bath for about 60 minutes and 25 g of unreacted PMVE and VF$_2$ was slowly released. The conversion of gases was 38%. After opening the autoclave, 150 ml of butanone was added and the organic layer was separated in a separating funnel, was dried over MgSO$_4$ and filtered through sintered glass (G4). The organic solvent was removed by a rotating vacuum evaporator at (40° C./20 mm Hg). The resulting yellow viscous liquid was dried at 40° C. and 0.01 mbar vacuum to constant weight. The product (yield 56%) was analyzed by $^1$H and $^{19}$F NMR spectroscopy.

(B) Synthesis of the Diazido Curing Agent:

The batch bismonoaddition of α,ω-diiodoperfluorohexane onto ethylene was performed in a 160 mL Hastelloy autoclave Parr System, equipped with a manometer, a rupture disk, inlet and outlet valves, and a mechanical anchor. An electronic device regulated and controlled both the stirring and the heating of the autoclave. The autoclave was left closed for 20 min. and purged with 30 bars of nitrogen pressure to prevent any leakage, and degassed afterwards. Then, a 2 mm Hg vacuum was operated for 15 min. The initiator di-4-tert-butylcyclohexyl peroxydicarbonate (4.22 g, 10 mmol) and 30.13 g (54.2 mmol) of I—C$_6$F$_{12}$—I in dry tert-butanol (40 mL) were introduced via a funnel tightly connected to the introduction valve. Next, ethylene (4.0 g, 0.14 mol) was introduced by double weighing. The autoclave was then heated up to 50° C. for 7 hours. After reaction, the autoclave was cooled to room temperature and then put into an ice bath. After degassing the unreacted monomer, the autoclave was opened. Tert-butanol was evaporated; the monomer was solubilized in THF and precipitated from cold pentane. The fluorinated diiodo product was filtered, washed, and dried at room temperature under a 20 mm Hg vacuum for 24 hours. The yield was 80%. FT-IR: 1138 cm$^{-1}$ ($v_{C-F}$)

$^1$H-NMR (δ CDCl$_3$) α: 3.2 ppm (t, $^3J_{HH}$=7.01 Hz, 4H); β: 2.6 ppm (m, 4H);

$^{19}$F-NMR (δ CDCl$_3$) g: −115.2 ppm (m, 4F); h: −121.8 ppm (m, 4F); i: −123.8 ppm (m, 4F).

A mixture composed of 7.80 g (12.8 mmol) of the above-prepared 1,10-diiodo-1H,1H,2H,2H,9H,9H,10H,10H-perfluorodecane and 2.21 g (30.8 mmol) sodium azide dissolved in DMSO (25 mL) and water (1 mL) was stirred at 50° C. for 48 hours. Then, the reaction mixture was poured into water and was extracted with diethyl ether. This procedure was repeated twice. The organic layer was washed with water twice, then with 10% sodium sulfite solution twice, water again (3 times) and then brine, dried over MgSO$_4$ and filtered. Solvent was evaporated under reduced pressure to give 5.0 g of a pale green oil. The yield of the fluorinated diazide was 94%.

FT IR: 2100 cm$^{-1}$ ($v_{N3}$); 1138 cm$^{-1}$ ($v_{C-F}$)

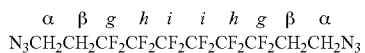

$^1$H NMR (δ CDCl$_3$) α: 3.55 ppm (t, $^3J_{HH}$=7.07 Hz, 4H), β: 2.30 ppm (m, 4H)

$^{19}$F NMR (δ CDCl$_3$) g: −114.2 ppm (m, 4F); h: −121.8 ppm (m, 4F); i: −123.8 ppm (m, 4F)

A curable composition of the invention is made by dissolving 5 g of the above-prepared VF$_2$/PMVE/8-CNVE fluoroelastomer in FC-75 solvent (available from 3M) and then mixed with 0.4 g of the telechelic 1,10-diazido-1H,1H,2H,2H,9H,9H,10H,10H-perfluorodecane curing agent prepared above. This curable composition is mixed until a clear, transparent and homogenous solution is obtained. The curable composition is then cast into a mold, resulting in a film. The film is cured at 150° C. for 14 to 20 hours.

Example 2

A curable composition of the invention was made by dissolving 5 g of a TFE/PMVE/8-CNVE fluoroelastomer (prepared substantially as disclosed in U.S. Pat. No. 5,789,489 and containing about 64-67 mol % TFE, 32-34 mol % PMVE and 0.7-1.2 mol % 8-CNVE) in FC-75 solvent (available from 3M) and then mixed with 0.4 g of the telechelic 1,10-diazido-1H,1H,2H,2H,9H,9H,10H,10H-perfluorodecane curing agent prepared above, and 0.5 g of zinc chloride. This curable composition was mixed until a clear, transparent and homogenous solution was obtained. The curable composition was then cast into a mold, resulting in a film. The film was cured at 150° C. for 14 to 20 hours. The resulting crosslinked fluoroelastomer composition was insoluble in FC-75, whereas the uncured composition had been soluble in FC-75. TGA showed that T10% was 442° C., while it was 424° C. for uncured fluoroelastomer.

A crosslinking mechanism is shown below wherein azide groups on the curative react with pendant nitrile groups on the fluoroelastomer to form crosslinks through tetrazole rings.

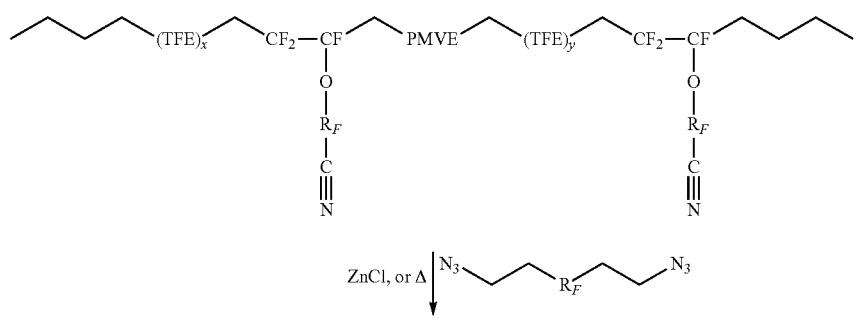

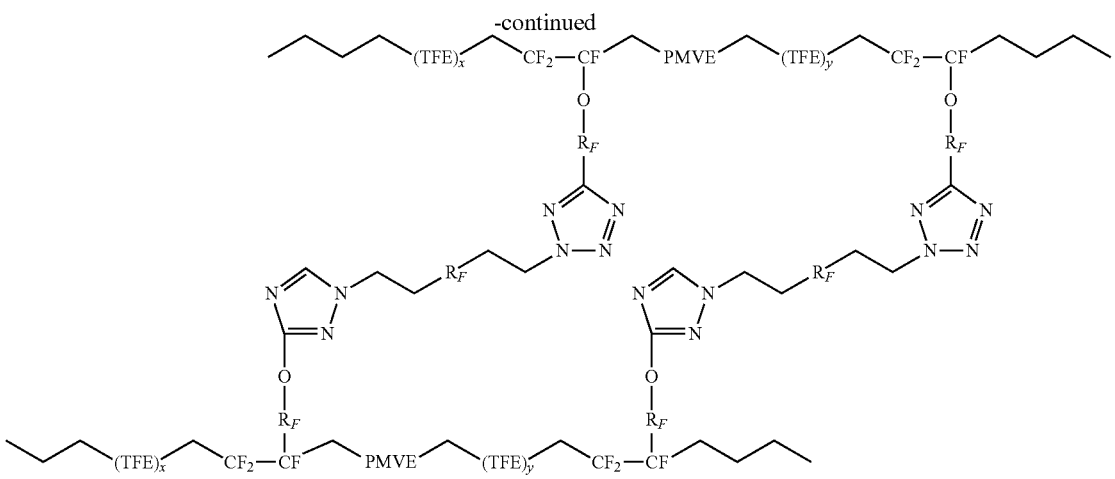

What is claimed is:

1. A curable composition comprising
A) a fluoroelastomer comprising copolymerized units of i) a first monomer selected from the group consisting of vinylidene fluoride and tetrafluoroethylene and ii) a cure site monomer having a cure site selected from the group consisting of azide, sulfonyl azide and carbonyl azide groups; and
B) a curative having the formula X—$(CH_2)_n$—R—$(CH_2)_m$—X, wherein X is an alkyne group or a nitrile group, n, m are independently 1 to 4, and R is selected from the group consisting of i) a $C_3$-$C_{10}$ fluoroalkylene group, ii) a $C_3$-$C_{10}$ fluoroalkoxylene group, iii) a substituted arylene group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin.

2. A curable composition of claim 1 wherein said cure site monomer is a sulfonyl azide selected from the group consisting of $CF_2$=$CFOCF_2CF(CF_3)OCF_2CF_2$—$SO_2N_3$; $CF_2$=$CFOCF_2CF_2$—$SO_2N_3$; $CF_2$=$CFOCF_2CF_2CF_2$—$SO_2N_3$; and $CF_2$=$CFOCF_2CF_2CF_2CF_2$—$SO_2N_3$.

3. A curable composition of claim 1 wherein said cure site monomer is $CF_2$=$CFOCF_2CF(CF_3)OCF_2CF_2$—$CON_3$.

4. A curable composition of claim 1 wherein said fluoroelastomer further comprises copolymerized units of at least one additional monomer, different from said first monomer and said cure site monomer, wherein said additional monomer is selected from the group consisting of fluorine-containing olefins, fluorine-containing vinyl ethers and hydrocarbon olefins.

5. A curable composition of claim 4 wherein said additional monomer is a fluoroolefin selected from the group consisting of vinylidene fluoride; hexafluoropropylene; tetrafluoroethylene; 1,2,3,3,3-pentafluoropropene; 1,1,3,3,3-pentafluoropropene; 3,3,3-trifluoropropene; chlorotrifluoroethylene and vinyl fluoride.

6. A curable composition of claim 4 wherein said additional monomer is a perfluoro(alkyl vinyl ether).

7. A curable composition of claim 1 wherein said curative is selected from the group consisting of NC—$(CF_2)_n$—CN and HC≡C—$(CF_2)_n$—C≡CH wherein n is an integer between 2 and 20.

* * * * *